United States Patent
Shiu

(10) Patent No.: US 8,248,045 B2
(45) Date of Patent: Aug. 21, 2012

(54) CHARGE PUMP CIRCUIT WITH CURRENT DETECTING AND METHOD THEREOF

(75) Inventor: Shian-Sung Shiu, Xizhi (TW)

(73) Assignee: Green Solution Technology Co., Ltd., Taipei County (TW)

(*) Notice: Subject to any disclaimer, the term of this patent is extended or adjusted under 35 U.S.C. 154(b) by 210 days.

(21) Appl. No.: 12/840,637

(22) Filed: Jul. 21, 2010

(65) Prior Publication Data

US 2011/0043140 A1 Feb. 24, 2011

(30) Foreign Application Priority Data

Aug. 24, 2009 (TW) .............................. 98128367 A

(51) Int. Cl.
*G05F 1/00* (2006.01)
*H02M 7/537* (2006.01)

(52) U.S. Cl. ........ 323/265; 323/273; 323/276; 323/277; 327/536; 327/514; 315/308; 315/312; 363/21.03; 363/132

(58) Field of Classification Search .................. 323/265, 323/273, 276, 277, 280, 281, 299, 267, 225, 323/284, 285; 315/308, 312, 244, 291; 327/514, 327/536; 363/21.02, 21.03, 97, 98, 131, 363/132

See application file for complete search history.

(56) References Cited

U.S. PATENT DOCUMENTS

| | | | |
|---|---|---|---|
| 7,081,742 B2* | 7/2006 | Ito et al. | 323/273 |
| 7,205,750 B2* | 4/2007 | Murakami | 323/267 |
| 7,250,810 B1* | 7/2007 | Tsen et al. | 327/536 |
| 7,271,642 B2* | 9/2007 | Chen et al. | 327/514 |
| 7,336,060 B2* | 2/2008 | Ito | 323/299 |
| 7,486,103 B2* | 2/2009 | Shiu et al. | 326/26 |
| 7,492,197 B2* | 2/2009 | Lin et al. | 327/157 |
| 7,977,891 B2* | 7/2011 | Shiu et al. | 315/291 |
| 7,977,926 B2* | 7/2011 | Williams | 323/223 |
| 7,999,487 B2* | 8/2011 | Szczeszynski | 315/291 |

* cited by examiner

*Primary Examiner* — Vibol Tan

(57) ABSTRACT

The present invention relates to a charge pump circuit with current detecting and a method thereof. The current detecting charge pump circuit includes a controlled current source, a load circuit which electrically connects to the charge pump circuit unit, and is driven by the charge pump circuit unit to generate a load current. A detecting circuit unit electrically connects to the load circuit, and produces a feedback signal according to the load circuit. A feedback circuit unit which electrically connects to the detecting circuit unit, receives the feedback signal, and adjusts a current of the controlled current source according to the feedback signal. The charge pump circuit also includes a protecting circuit unit which is able to detect feedback signal to protect the circuit according to the feedback signal.

20 Claims, 9 Drawing Sheets

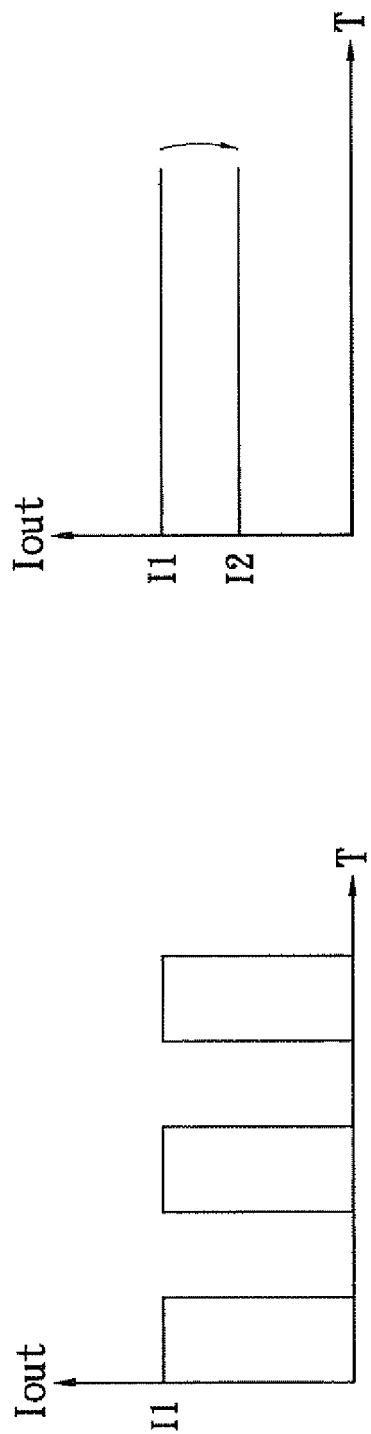
FIG. 1 PRIOR ART
FIG. 2 PRIOR ART
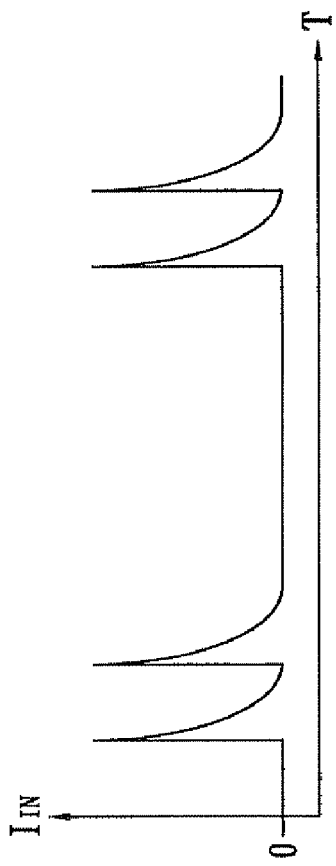
FIG. 3 PRIOR ART

CHARGE PUMP CIRCUIT WITH CURRENT DETECTING AND METHOD THEREOF

BACKGROUND OF THE INVENTION

1. Field of the Invention

The present invention relates to a charge pump circuit; in particular, the present invention relates to a charge pump circuit with current detecting and a feedback method thereof.

2. Description of Related Art

Light Emitting Diodes (LED's) provide features of, among others, high luminance efficiency, high brightness, low power consumption, long lifespan, reliable security, environment friendliness and fast startup, and numerous high-technology products are now adopting LED's as their light sources for applications. In general, LED driving is commonly accomplished by means of a current source offering constant direct current, thereby maintaining the stable brightness thereof. Especially, for portable devices using batteries as their power sources, since such batteries may be merely able to provide low voltage power, they are not suitable for driving the light source composed of multiple LED's connected in series. This means, it is required to boost the voltage of the batteries so as to successfully drive these LED's. Typically the boost DC-DC converter which is utilized to increase battery voltages, provides high conversion efficiency, but undesirably leads to significantly increase in manufacturing cost and PCB area occupation as well. Another approach for boosting battery voltages is to use a charge pump circuit.

The most concise method for the LED brightness adjustment according to the prior art is to adjust the LED current. FIG. 1 shows a current variation diagram in accordance with the LED brightness adjustment according to the prior art. In a conventional method, it adjusts the current I1, higher brightness, to the current I2, lower brightness, whereas in this way drifts of the LED emission spectrum may occur. For certain high-leveled products, or devices particularly sensitive to luminance chromaticity, e.g., monitors, such drifts of the LED emission spectrum can not be tolerated.

To eliminate the problem caused by the LED emission spectrum drifts, another technology is developed which applies a characteristic of human eyes, a persistence of vision, for flash light to control and rapidly switch the current inputted to the LED, thereby resulting in the LED twinkling effects. FIG. 2 shows a current switching diagram in accordance with the LED brightness adjustment according to the prior art. It is possible to use a switch device to quickly switch the current I1 shown in FIG. 1. Because of the characteristic of human eyes, a persistence of vision, for flash light, especially regarding to the duration of flash light which is less than 16.67 μs, i.e.: switched at 60 Hz or more in frequency, the flash light becomes undistinguishable. By using such a technology, therefore, it is effectively equivalent to generate the luminance by supplying the average current to the LED without causing LED emission spectrum drifts.

The conventional charge pump circuit only comprises a few components such as switches and capacitors, and upon operation of the switches in the charge pump circuit to charge the capacitors, without the existence of resistors or others components for current blockage, the input current may generate current surges as shown in FIG. 3. Hence, when the switch is on and starts to charge the capacitor, the input current initially charges with greater current, but then the input current reduces as the voltage of the capacitor increases. Since the portable device usually employs batteries as its power source, sudden output of massive current may lead to dramatic falloff in the battery voltage. Additionally, the portable device is commonly equipped with several circuits of different functions therein at the same time, all of which use this power source to execute. As a result, other circuits may be inevitably interfered by the surges shown in FIG. 3; for example, noises may be generated in an audio circuit and the like.

Accordingly, in order to achieve the objectives of providing stable output current to lighting devices such as LED's and zero interference to other co-existing circuits in the portable device using the same power source, it is necessary to make further improvements in accordance with the charge pump circuit according to the prior art.

SUMMARY OF THE INVENTION

Embodiments of the present invention disclose a charge pump circuit with current detecting and a method thereof. The charge pump circuit with current detecting according to the embodiments of the present invention comprises a feedback circuit unit which adjusts a controlled current source of the charge pump circuit unit based on a feedback current generated by a load circuit, thereby achieving the objective of current stabilization.

According to an embodiment of the present invention, a feedback control method for a charge pump circuit comprises: providing a charge pump circuit unit, in which the charge pump circuit unit includes a controlled current source controlling the input of an input current to the charge pump circuit unit; providing a load circuit which electrically connects to the charge pump circuit unit to have a load current from the charge pump circuit unit passing through the load circuit; providing a detecting circuit unit which electrically connects to the load circuit and produces a feedback signal based on the load current; and providing a feedback circuit unit which electrically connects to the detecting circuit unit, in which the feedback circuit unit receives the feedback signal and accordingly adjusts the input current of the controlled current source.

According to another embodiment of the present invention, a charge pump circuit is provided which electrically connects to a load circuit, adapted to produce a load current flowing through the load circuit, comprising: a charge pump circuit unit which produces the load current, in which the charge pump circuit unit includes a controlled current source controlling the input of an input current to the charge pump circuit unit; a detecting circuit unit which electrically connects to the load circuit and produces a feedback signal based on the load current; and a feedback circuit unit which electrically connects to the detecting circuit unit and adjusts the input current of the controlled current source based on the feedback signal.

According to yet another embodiment of the present invention, a charge pump circuit unit comprises: a controlled current source; a dummy path which connects the controlled current source to ground; a capacitor which electrically connects to the controlled current source and the dummy path through a first switch, and the controlled current source charges the capacitor through the first switch; and a second switch which connects to the capacitor and a load circuit, and the capacitor is discharged through the second switch; wherein the first switch and the second switch are switched respectively based on a first switch signal and a second switch signal. The conductive periods of the first switch and the second switch are non-overlapped; when the first switch signal and the second switch signal are both cutoff, the current from the controlled current source flows toward ground through the dummy path, and when the first switch signal and the second switch signal are both at a low level, the current from the controlled current source flows toward ground through the dummy path.

Therefore, the embodiments according to the present invention provide a charge pump circuit with feedback current detecting, wherein the feedback circuit unit of the charge pump circuit adjusts the controlled current source of the charge pump circuit unit based on a feedback current, thereby stabilizing the current passing through the load circuit; and furthermore, a protecting circuit unit is provided which protects the circuitry in the feedback circuit from possible occurrences of over-current or under-current damages to the load circuit and the charge pump circuit.

Besides, according to the embodiments of the present invention, a charge pump circuit providing stable input current is disclosed.

The above-said summary and the following detailed descriptions and appended drawings are all for further illustrating the approaches, means and effects taken by the present invention to achieve the prescribed objectives. Other purposes and advantages of the present invention will be specifically explained in the texts set forth hereinafter.

BRIEF DESCRIPTION OF THE DRAWINGS

FIG. 1 shows a current variation diagram in accordance with the LED brightness adjustment according to the prior art.

FIG. 2 shows a current switching diagram in accordance with the LED brightness adjustment according to the prior art.

FIG. 3 shows a diagram of input current waveforms in accordance with a charge pump circuit according to the prior art.

DETAILED DESCRIPTION OF THE PREFERRED EMBODIMENTS

Figure 4:
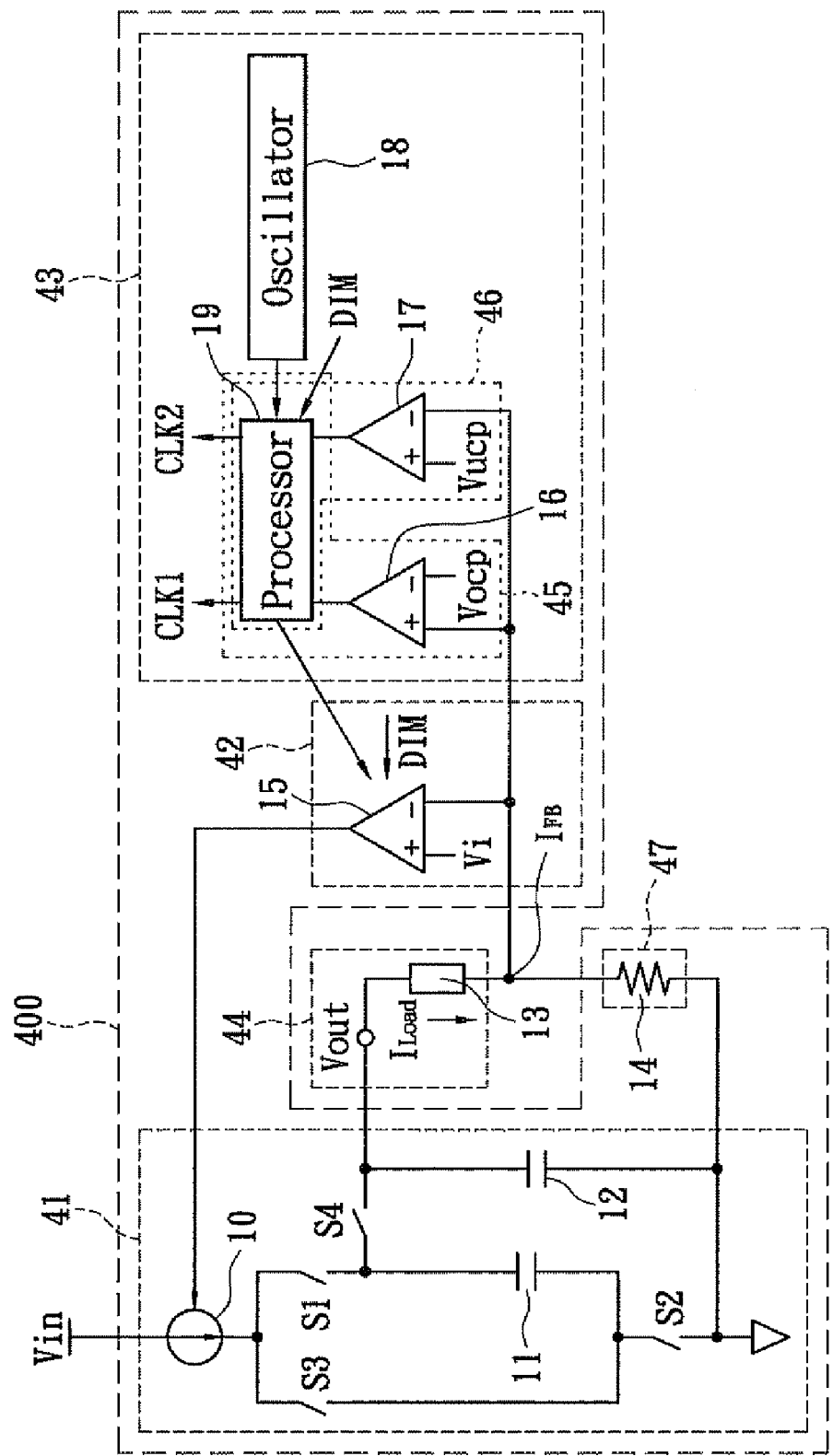
FIG. 4 shows a circuit diagram for the charge pump circuit of a first embodiment according to the present invention.

FIG. 4 shows a circuit diagram for the charge pump circuit of a first embodiment according to the present invention. The illustrated charge pump circuit 400 comprises a charge pump circuit unit 41, a feedback circuit unit 42, a protecting circuit unit 43 and a detecting circuit unit 47. The charge pump circuit unit 41 includes a controlled current source 10, switches S1, S2, S3, S4 and capacitors 11, 12. The feedback circuit unit 42 has an error amplifier 15. The protecting circuit unit 43 includes a first and a second comparators 16 and 17, an oscillator 18, a processor 19. The detecting circuit unit 47 includes a detecting resistor 14, connected to a load circuit 44 which has a load unit 13, such as at least one LED in the present embodiment, but not limited thereto for the present invention.

An input voltage source $V_{in}$ is electrically connected with the controlled current source 10 of the charge pump circuit unit 41 to provide a constant voltage. The controlled current source 10 electrically connects to the first terminals of the switches S1 and S3, the second terminal of the switch S3 connects to the first terminal of the switch S2 and the second terminal of the switch S2 is grounded. The second terminal of the switch S1 connects to the first terminal of the switch S4 and the first terminal of the capacitor 11, while the second terminal of the capacitor 11 connects to the first terminal of the switch S2. Besides, the second terminal of the switch S4 and the first terminal of the load capacitor 12 connect to the first terminal of the load unit 13 in the load circuit 44, and the second terminal of the capacitor 12 is grounded. Herein the switches S1 and S2 are switched to on or off state under the control of a first switch signal CLK1, and the switches S3 and S4 are switched to on or off state under the control of a second switch signal CLK2. In other words, the capacitor 11 can be charged through the connection to the controlled current source 10 by way of the first switches S1 and S2, discharged toward the capacitor 12 and the load circuit 44 by way of the second switches S3 and S4 for outputting a drive voltage $V_{out}$.

The charge pump circuit unit 41 is essentially to provide the load circuit 44 with a stable current source and so a load current $I_{Load}$ flows through the load unit 13. The first terminal of the detecting resistor 14 in the detecting circuit unit 47 electrically connects to the second terminal of the load unit 13, and the second terminal of the detecting resistor 14 is grounded, such that the detecting circuit unit 47 detects the load current $I_{Load}$ and produces accordingly a feedback signal $I_{FB}$.

The feedback circuit unit 42 receives the feedback signal $I_{FB}$ from the detecting circuit unit 47 in order to monitor the load current $I_{Load}$ of the load unit 13, and adjusts the controlled current source 10 based on the feedback signal $I_{FB}$ so as to stabilize the load current $I_{Load}$ flowing through the load unit 13. The feedback unit 42 comprises an error amplifier 15, in which a inverting terminal of the error amplifier 15 connects to the first terminal of the detecting circuit unit 47, and the non-inverting terminal of the error amplifier 15 receives the reference voltage $V_i$. The output terminal of the error amplifier 15 electrically connects to the controlled current source 10, thereby controlling the current value of the controlled current source 10. Additionally, the error amplifier 15 also receives a control signal DIM, and stops or provides the current of the controlled current source 10 based on the control signal DIM, in which the control signal DIM may be a dimming signal. The error amplifier 15 controls the controlled current source 10 to stop or provide the current with frequency which is higher than the frequency range perceivable by human ears, such as 20 kHz or above, thereby preventing generation of noise signals at low frequency which may undesirably cause audio noise or interference with other circuits connected to the same power source in the aforementioned portable device. The error amplifier 15 may be also subject to the control of the processor 19 in order to control the controlled current source 10. Furthermore, the control signal DIM may also directly control the processor 19 in place of the control over the error amplifier 15. The control signal DIM can be a pulse signal or an analog signal. If it is an analog signal, then the processor 19 can convert the analog signal with different levels to the corresponding operation period, and determine the pulse widths of the first switch signal CLK1 and the second switch signal CLK2, thereby achieving the dimming effect.

The protecting circuit unit 43 is adapted to protect the charge pump circuit unit 41 from over-current and under-current conditions. The non-inverting terminal of the first comparator 16 and the inverting terminal of the second comparator 17 connect to the first terminal of the detecting circuit unit 47, the inverting terminal of the first comparator 16 receives the over-current reference voltage $V_{ocp}$, and the non-inverting terminal of the second comparator 17 receives the under-current reference voltage $V_{ucp}$, while the output terminals of the first and second comparators 16 and 17 both connect to the processor 19. Herein the over-current reference voltage $V_{ocp}$ is higher than the under-current reference voltage $V_{ucp}$. The processor 19 electrically connects to the oscillator 18, and one output terminal of the processor 19 connects to the error amplifier 15. When the feedback signal $I_{FB}$ becomes greater than the over-current reference voltage $V_{ocp}$, indicating occurrence of abnormality in the circuit which causes the load current $I_{Load}$ to inappropriately rise up and thus exceed an over-current value. Alternatively, when the feedback signal $I_{FB}$ becomes less than the under-current reference voltage $V_{ucp}$, indicating occurrence of abnormality in the circuit which makes the load current $I_{Load}$ incapable of increasing to surpass an under-current value. In either case, the protecting circuit unit 43 stops current outputted from the controlled current source 10 by means of controlling the feedback circuit unit 42. However, as the charge pump circuit 400 initially starts or a sudden abnormality that temporarily occurs an insufficient provision of power to the load circuit 44, the feedback signal $I_{FB}$ may be momentarily below the under-current reference voltage $V_{ucp}$. The protecting circuit unit 43 may stops the operations of the charge pump circuit when the under-current state occurs for a prescribed duration, thereby preventing erroneous determination. Besides, the processor 19 produces the first switch signal CLK1 and the second switch signal CLK2 in accordance with the oscillator 18, in which the frequency of the oscillator 18 is fixed, for easily filter out electromagnetic interferences.

When the switches S1, S2 are turned on by the first switch signal CLK1 and the switches S3, S4 are turned off by the second switch signal CLK2, a charging path can be created. The input voltage source $V_{in}$ through the controlled current source 10 provides a stable current to charge the capacitor 11. At this moment, the power required for operations of the load circuit 44 is provided by the capacitor 12. When the switches S3, S4 are turned on and the switches S1, S2 are turned off, a discharging path can be created to discharge the capacitor 11 toward the load circuit 44 and capacitor 12.

Figure 5:
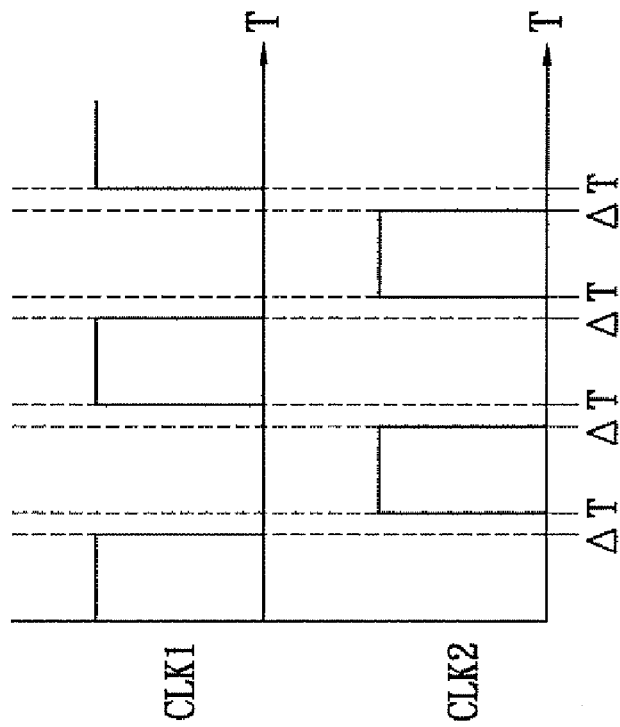
FIG. 5 shows a signal diagram of the first embodiment according to the present invention.

FIG. 5 shows a signal diagram of the first embodiment according to the present invention. It is noticed that in the following descriptions high voltage level indicates the conducting mode of the corresponding switch and low voltage level indicates the cutoff mode of the corresponding switch; but in practice, it can be modified based on the features of the switch. For example, in terms of P-typed metal oxide semiconductor switch, it is conductive at low voltage level and cutoff at high voltage level.

The first switch signal CLK1 and the second switch signal CLK2 do not mutually overlap but apart from each other by a time interval ΔT. Thereby, there are time intervals ΔT between the conducting time of the switches S1, S2 and the conducting time of the switches S3, S4 become conducting, so as to prevent shoot through in both two groups of switches which may cause inappropriate discharge from the capacitor 11 or negatively affect the stability of the feedback control.

Refer again to FIG. 4. The feedback circuit unit 42 compares the reference voltage $V_i$ with the feedback signal $I_{FB}$, to further adjust the current value of the controlled current source 10. If the feedback signal $I_{FB}$ is greater than the reference voltage $V_i$, the error amplifier 15 reduces the current value of the controlled current source 10. Contrarily, if the feedback signal $I_{FB}$ is smaller than the reference voltage $V_i$, the error amplifier 15 increases the current value of the controlled current source 10. In this way, the load current $I_{Load}$ may be kept at a stable current value.

Figure 6:
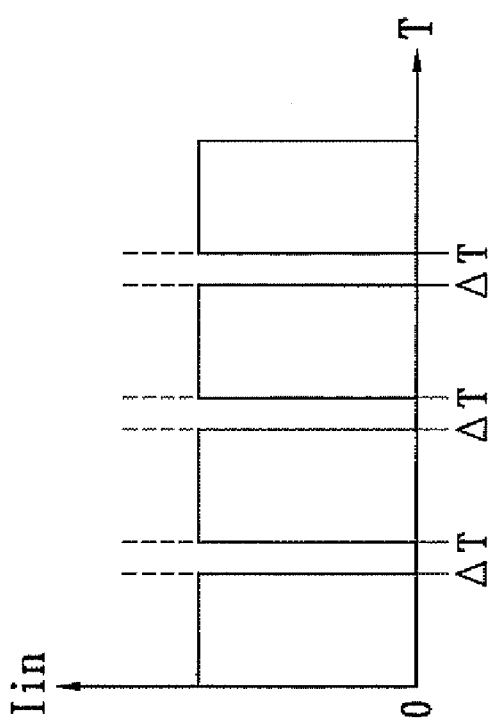
FIG. 6 shows a waveform diagram for the input current of the first embodiment according to the present invention.

FIG. 6 shows a waveform diagram for the input current of the first embodiment according to the present invention. Since the present embodiment uses a controlled current source 10 to manipulate the magnitude of the input current $I_{in}$, the input current $I_{in}$ can behave like a stable input current $I_{in}$, as shown in FIG. 6. Therefore, the embodiment of the present invention does not generate current surges as shown in FIG. 3. Herein, due to the time interval ΔT between switching, all switches S1, S2, S3 and S4 are cutoff during such a time interval ΔT, leading to interruption of the input current $I_{in}$.

Figure 7:
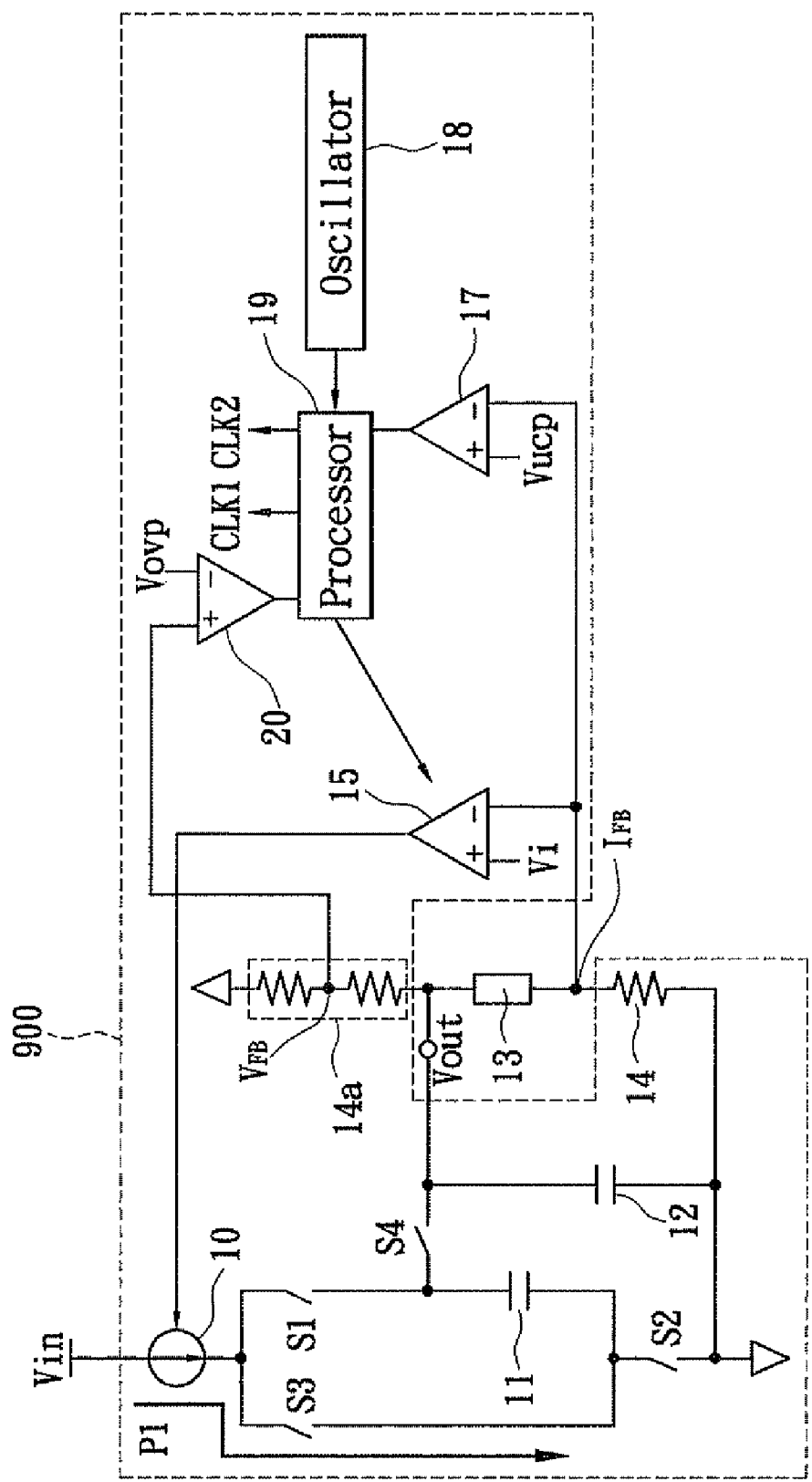
FIG. 7 shows a circuit diagram for the charge pump circuit with a dummy path of a second embodiment according to the present invention.
Figure 8:
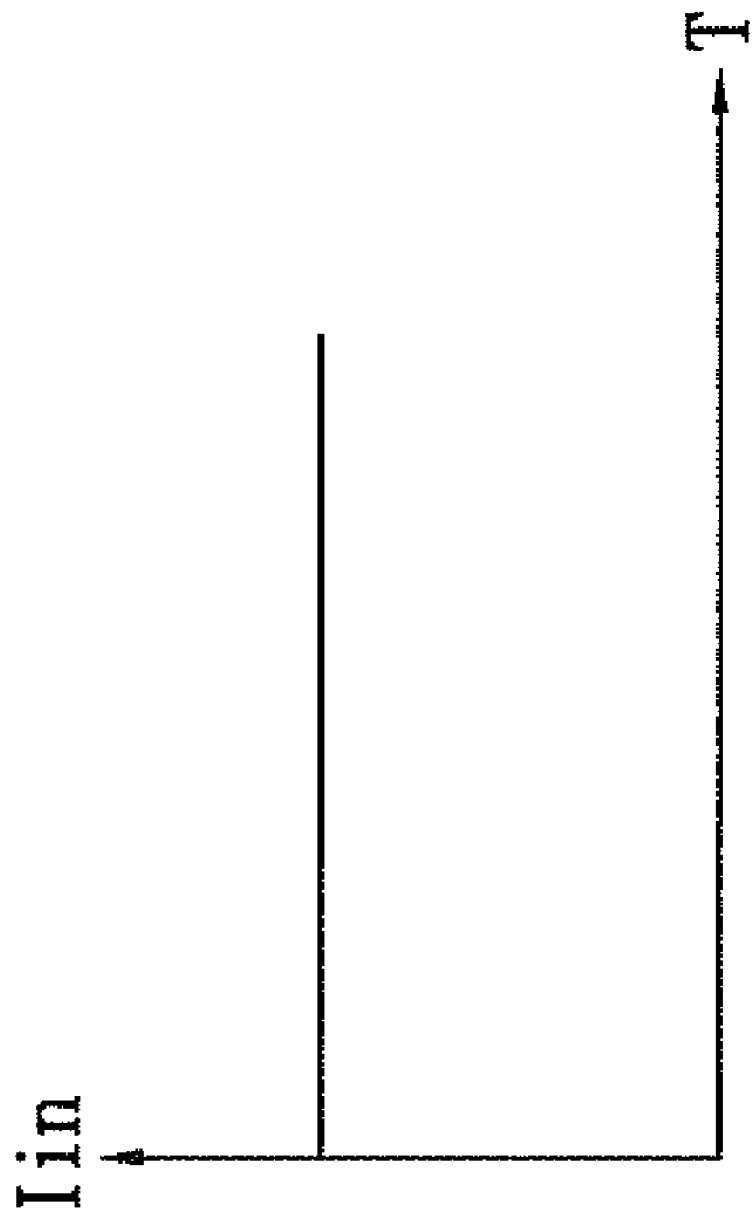
FIG. 8 shows a current waveform diagram for the input current of the second embodiment according to the present invention.

As mentioned before, because a time interval ΔT exists between the first switch signal CLK1 and the second switch signal CLK2 and all switches S1, S2, S3 and S4 are cutoff during such a time interval ΔT, the input current $I_{in}$, at this moment becomes zero. In order to stabilize the input current waveform of the input current $I_{in}$, an embodiment of a charge pump circuit 900 having a dummy path in accordance with the present invention is provided. FIG. 7 shows a circuit diagram for the charge pump circuit with a dummy path of a second embodiment according to the present invention. A dummy path P1 is added to the charge pump circuit 900, which dummy path P1 connecting the second terminal of the controlled current source 10 to ground. During the aforementioned time interval ΔT, the switches S1, S4 are cutoff and the switches S2, S3 are conductive. At this moment, the input current $L_{in}$ may flow to ground through the dummy path formed by the switches S2, S3, so the input current $I_{in}$ does not generate dramatic current fluctuations. Consequently, the input current $I_{in}$ can provide a stable input current as the current waveform diagram shown in FIG. 8.

Besides, the detecting circuit unit further includes an output voltage detecting resistor 14a. The first terminal of the output voltage detecting resistor 14a electrically connects to the first terminal of the load unit 13, the second terminal of the output voltage detecting resistor 14a is ground. The output voltage detecting resistor 14a generates a voltage feedback signal $V_{FB}$ based on the drive voltage $V_{out}$ of the load unit 13. The first comparator 16 in the protecting circuit unit 43 is replaced by a third comparator 20. The non-inverting terminal of the third comparator 20 receives the voltage feedback signal $V_{FB}$, while the inverting terminal thereof receives an over-voltage reference voltage $V_{ovp}$. When the voltage feedback signal $V_{FB}$ is greater than the over-voltage reference voltage $V_{ovp}$, indicating occurrence of abnormality in the circuit which causes the drive voltage $V_{out}$ to inappropriately rise up and exceed an over-voltage value. Upon occurrence of such an over-voltage condition, the protecting circuit unit 43 halts the current outputted from the controlled current source 10 by means of the error amplifier 15. Other components and their connections shown in FIG. 7 are identical to the counterparts in FIG. 4, and descriptions thereof are omitted for brevity.

Figure 9:
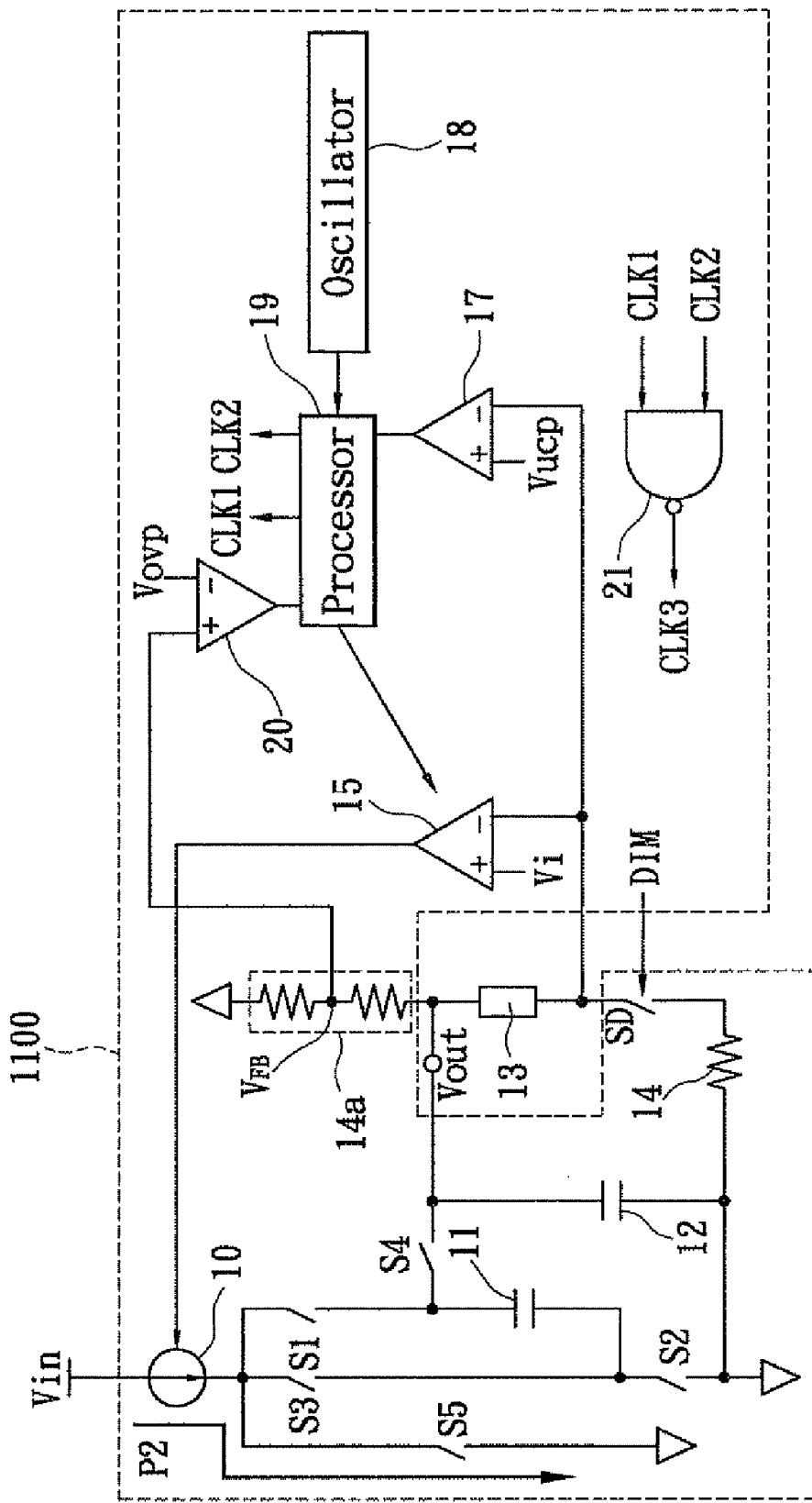
FIG. 9 shows a circuit diagram for the charge pump circuit with a dummy path of a third embodiment according to the present invention.

FIG. 9 shows a circuit diagram for the charge pump circuit with a dummy path of a third embodiment according to the present invention. The charge pump circuit 1100 of the embodiment according to the present invention is additionally designed with a dummy path P2, which dummy path P2 connecting the second terminal of the controlled current source 10 to ground. The dummy path P2 comprises a switch S5, in which the first terminal of the switch S5 electrically connects to the second terminal of the controlled current source 10, while the second terminal thereof is grounded. An NAND gate 21 is herein placed whose input terminals respectively receive the first switch signal CLK1 and the second switch signal CLK2, and a third signal CLK3 is generated which controls on and off in the switch S5. That is, when the first switch signal CLK1 and the second switch signal CLK2 are both at low voltage levels, the NAND gate produces the third switch signal CLK3 which is at a high voltage level. So the switch S5 can be conductive based on such a third switch signal CLK3, and the input current $I_{in}$ flows to ground by way of the switch S5 in the dummy path P2. Consequently, the input current $I_{in}$ remains stable, and hence the input current $I_{in}$ can be a steady input current as shown in the input current waveform diagram of FIG. 8.

Besides, a dimming switch SD is also added to the charge pump circuit 1100 which is coupled between the load unit 13 and the detecting resistor 14 and performs the conducting and cutoff mode based on the control signal DIM. Comparing the implemented circuits shown in FIG. 4 and FIG. 7, the implemented circuit illustrated in FIG. 9 uses the dimming switch SD to substitute the error amplifier 15 in order to receive the control signal DIM, thereby preventing time delay of dimming due to the charge and discharge of the load capacitor 12 and improving precision in dimming control. Other components and their connections shown in FIG. 9 are identical to the counterparts in FIG. 7, and descriptions thereof are omitted for brevity.

Figure 10:
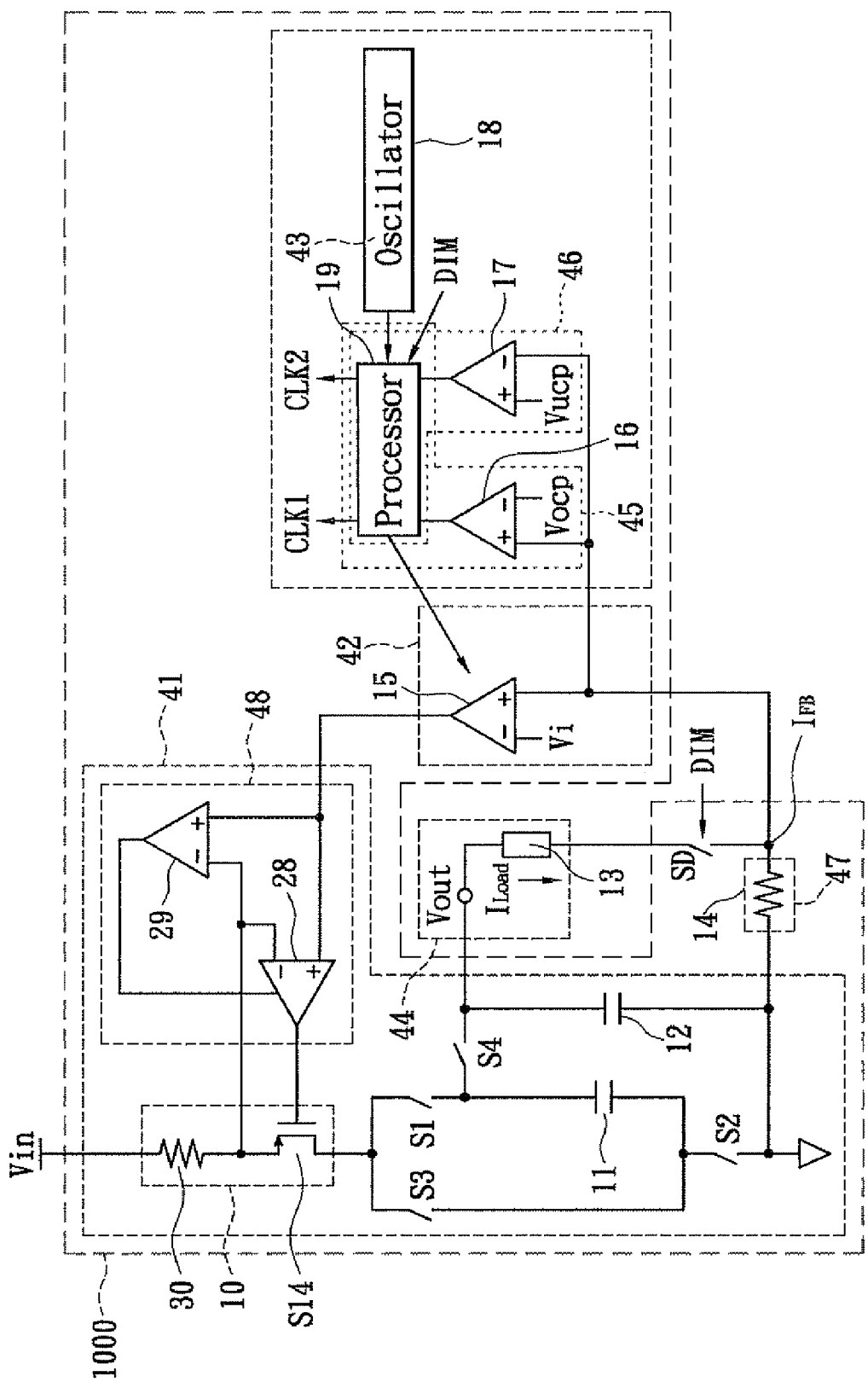
FIG. 10 shows a circuit diagram for the charge pump circuit of a fourth embodiment according to the present invention.

FIG. 10 shows a circuit diagram for the charge pump circuit of a fourth embodiment according to the present invention. The charge pump circuit 1000 comprises a controlled current source 10 in which the controlled current source 10 includes a resistor 30 and a switch S14 connected in series. Furthermore, the output terminal of the feedback circuit unit 42 connects to a current limiting circuit unit 48. Herein the current limiting circuit unit 48 comprises an error amplifier 28 and a fourth comparator 29, in which the fourth switch S14 in the present embodiment is a PMOS transistor switch. The first terminal of the resistor 30 connects to the input voltage $V_{in}$, the first terminal of the transistor switch S14 connects to the second terminal of the resistor 30, the inverting terminal of the error amplifier 28, and the inverting terminal of the fourth comparator 29, the gate thereof connects to the output terminal of the error amplifier 28, while the second terminal thereof connects to the first terminal of the switches S1 and S3. The non-inverting terminal of the error amplifier 28 and the non-inverting terminal of the fourth comparator 29 connect to the output terminal of the error amplifier 15. The error amplifier 28 receives the output signal from the fourth comparator 29, and operates or shuts down in accordance with the output signal from the fourth comparator 29. In addition to the same dimming approach as FIG. 9, other components and their connections are identical to the counterparts in FIG. 4.

The current limiting circuit unit 48 takes the output signal from the error amplifier 15 as the current limiting reference value. When the feedback signal $I_{FB}$ is lower than the reference voltage $V_i$, the output voltage level of the error amplifier 15 in the feedback circuit unit 42 falls down so as to increase the current limiting value in the current limiting circuit unit 48 (i.e., the trigger point of the fourth comparator 29 moves to a higher current value); contrarily, when the feedback signal $I_{FB}$ is higher than the reference voltage $V_i$ the output voltage level of the error amplifier 15 arises in order to reduce the current limiting value in the current limiting circuit unit 48. When a smaller current flows through the resistor 30, the voltage level at the second terminal of the resistor 30 will be higher than the current limiting reference output value from the error amplifier 15, and the fourth comparator 29 outputs a signal at a low level. The error amplifier 28 receives the low level output signal by the fourth comparator 29 and stops operating, whose output signal of low level causes the switch S14 been turned on with the minimum on-resistance. On the other hand, if higher current flows through the resistor 30 such that the voltage level at the second terminal of the resistor 30 is lower than the current limiting reference value, the fourth comparator 29 outputs a signal at a high level and the error amplifier 28 receives the high level signal to start operating. In this case, the voltage level at the inverting terminal of the error amplifier 28 is lower than the voltage level at the non-inverting terminal, thus the output voltage level of the error amplifier 28 increases for having the voltage level at the inverting terminal and the voltage level at the non-inverting kept at the same value which means the current flowing through the resistor 30 would be clamped at a predetermined clamp current value, and such a predetermined clamp current value would be determined by the feedback signal $I_{FB}$.

Besides, the voltage level at the connection point of the transistor switch S14 and the resistor 30 may vary due to noise effect, and so the input voltage at the inverting terminal of the fourth comparator 29 to change around the current limiting value, such that the fourth comparator 29 frequently outputs high or low level signals as the input voltage varies to enable or disable the operating of the error amplifier 28. Therefore, the input signal level at the non-reverse terminal of the fourth comparator 29 is preferably slightly higher than the input signal level at the non-reverse terminal of the error amplifier 28, so as to prevent frequent operations in the error amplifier 28 due to the noise.

Figure 11A:
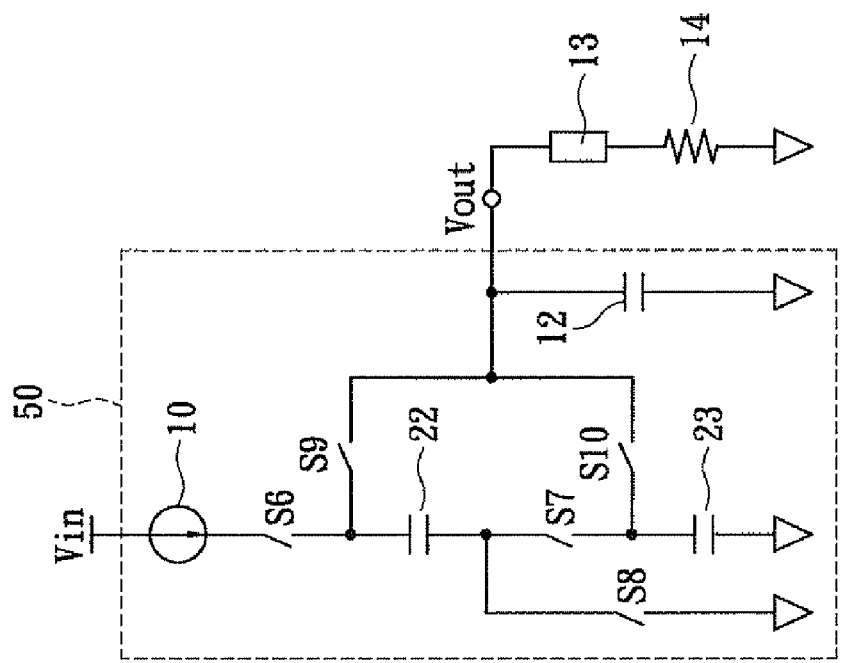
FIGS. 11A and 11B respectively show a circuit diagram for the charge pump circuit unit of a fifth embodiment according to the present invention.
Figure 11B:
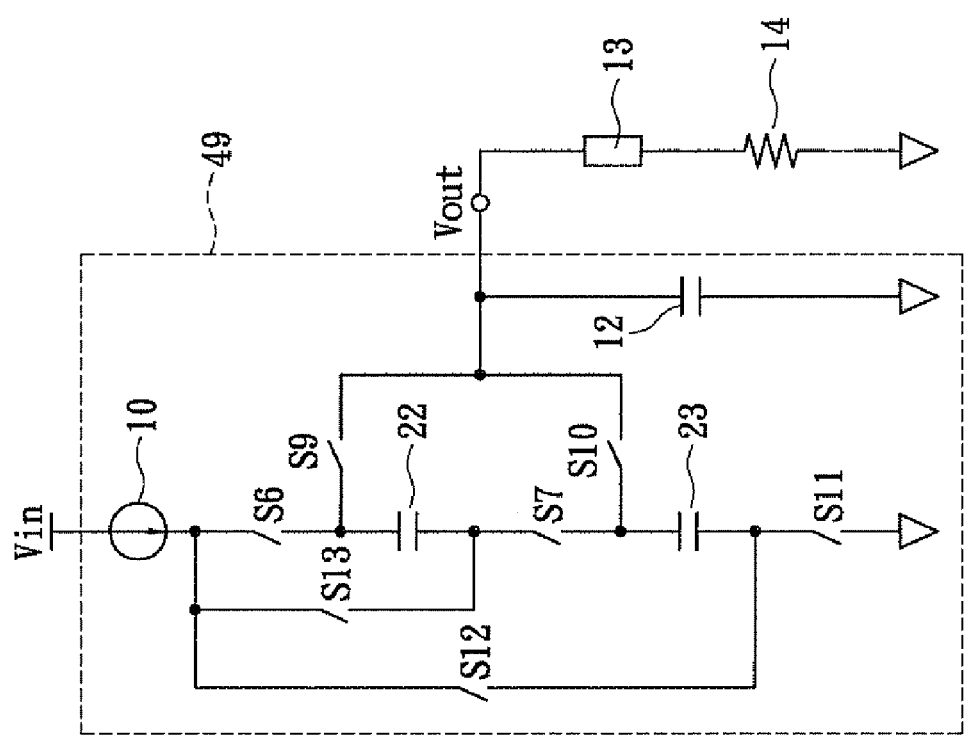

FIGS. 11A and 11B respectively show a circuit diagram for the charge pump circuit unit of a fifth embodiment according to the present invention. Refer now to FIG. 11A, wherein a circuit diagram shows the application of the present invention to a 0.5× voltage charge pump circuit unit 49, comprising a controlled current source 10, switches S6~S10 and capacitors 12, 22, and 23. The input voltage source $V_{in}$ provides the voltage to the charge pump circuit unit 50. The first terminal of the controlled current source 10 connects to the input voltage source $V_{in}$, and whose second terminal electrically connects to the first terminal of the switch S6. The second terminal of the switch S6 electrically connects to the first terminals of the switch S9 and the capacitor 22 at the same time. The second terminal of the capacitor 22 electrically connects to the first terminals of the switch S7 and the switch S8 at the same time. The second terminal of the switch S7 electrically connects to the first terminals of the switch S10 and the capacitor 23. The second terminal of the switch S8 and the second terminal of the capacitor 23 are respectively grounded. Finally, the second terminals of the switch S9 and the switch S10 electrically connect to the capacitor 12 for providing the drive voltage $V_{out}$ in the load unit 13.

Herein the switches S6 and S7 are under the control of the first switch signal CLK1, while the switches S8, S9 and S10 are under the control of the second switch signal CLK2. Consequently, when the switches S6 and S7 are conducted under the control of the first switch signal CLK1, and the switches S8, S9 and S10 are cutoff, then the input voltage source $V_{in}$ charges the capacitors 22 and 23. Next, when the switches S8, S9 and S10 are conducted under the control of the second switch signal CLK2 and the switches S6 and S7 are cutoff, the second terminal of the capacitor 22 would be grounded. So, the electrical power stored in the capacitor 22 and the capacitor 23 would be outputted to the capacitor 12 and the load unit 13 respectively via the switch S9 and the switch S10. Therefore, by means of the circuit in the present embodiment, it is possible to flexibly transform the input voltage $V_{in}$ into an utmost 0.5× input voltage $V_{in}$ to the load unit 13.

As shown in FIG. 11B, the components included in the charge pump circuit unit 50 are similar to counterparts found in FIG. 11A, in which only the switch S8 is removed but additionally placed with switches S11, S12 and S13. Herein the connections among the controlled current source 10, capacitors 12, 22, 23 and switches S6, S7, S9 and S10 are identical to the counterparts illustrated in FIG. 11A. The first terminals of the switches S12, S13 electrically connect to the second terminal of the controlled current source 10 and the first terminal of the switch S6. The first terminal of the switch S11 electrically connects to the capacitor 23 and the second terminal of the switch S12 and the second terminal of the switch S11 is grounded, while the second terminal of the switch S13 electrically connects to the second terminal of the capacitor 22 and the first terminal of the switch S7.

Herein the switches S6, S7 and S11 are controlled by the first switch signal CLK1, and the switches S9, S10, S12 and S13 are controlled by the second switch signal CLK2. Therefore, when the switches S6, S7 and S11 are conducted by the first switch signal CLK1, the switches S9, S10, S12 and S13 are cutoff, and then the input voltage source $V_{in}$ would charge the capacitors 22 and 23. Next, as the switches S9, S10, S12 and S13 are conducted by the second switch signal CLK2 and the switches S6, S7 and S11 are cutoff, then the second terminals of the capacitor 22 and the capacitor 23 respectively connect to the input voltage source $V_{in}$ through the switch S13 and the switch S12. Hence the electrical power stored in the capacitor 22 and the capacitors 23 are respectively outputted to the capacitor 22 and the load unit 13 via the switch S9 and the switch S10. Therefore, with the circuit of the present embodiment, the drive voltage $V_{out}$ would be possibly transform into an utmost 1.5× input voltage $V_{in}$ which could be outputted to the load circuit 44.

Figure 12A:
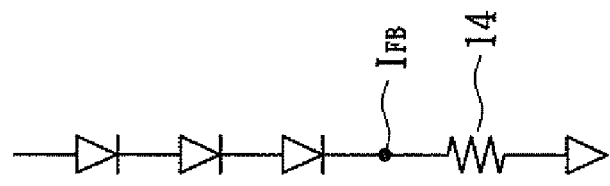
FIGS. 12A, 12B and 12C respectively show a circuit structure diagram for the load unit and the detecting circuit unit of a sixth embodiment according to the present invention.
Figure 12B:
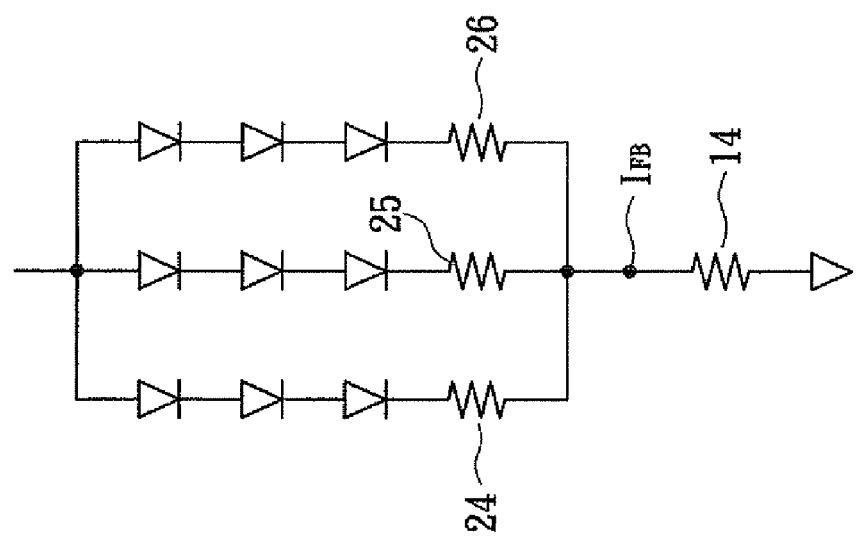
Figure 12C:
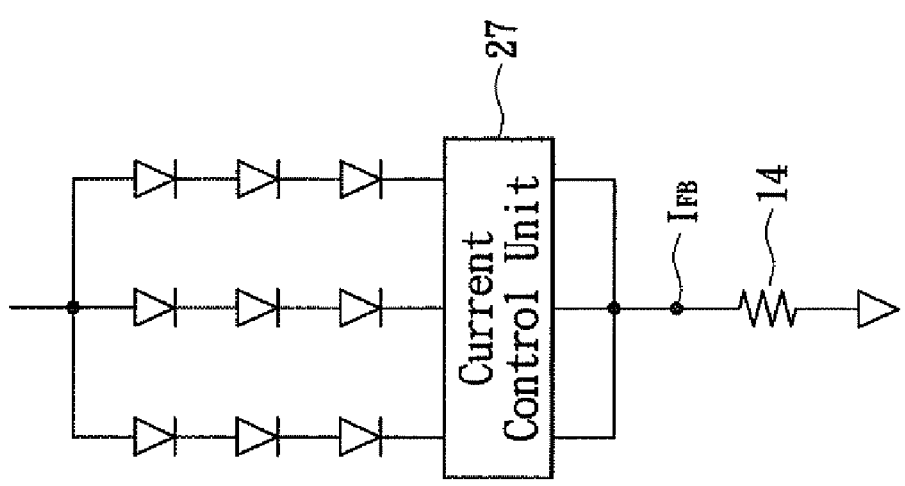

FIGS. 12A, 12B and 12C respectively show a circuit structure diagram for the load unit and the detecting circuit unit of a sixth embodiment according to the present invention. FIG. 12A shows a circuit which comprises a plurality of LED's connected in series, as well as a detecting resistor 14 connects such LED's in series. Comparing with the conventional charge pump circuit that outputs a constant voltage, the charge pump circuit of the present invention operates as a constant current source, by detecting the feedback signal $I_{FB}$, to drive the LED's and so as to greatly increase the drive efficiency in the charge pump circuit unit 41. Besides, since the identical current flows through such LED's, these LED's may emit light at an approximately identical luminance.

FIG. 12B illustrates a circuitry, wherein a set of series LED circuit includes multiple LED's and a resistor connected in series, and parallel connect to couple sets of series LED circuit, which then further connects to a detecting resistor 14 in series. Resistors 24, 25 and 26 in these sets of LED series circuits are mainly used for current equalization.

FIG. 12C shows a circuitry, wherein plural sets of serially connected LED's are connected in parallel and then connected to a current control unit 27 in series, and then further connecting in series to a detecting resistor 14. The present embodiment is similar to FIG. 12B, but it alternatively uses a current control unit 27 to control current in each set of LED series circuits, so as to equalize the current flowing through each set of LED series circuits.

The aforementioned texts illustrate the detailed descriptions and appended drawings of the embodiments according to the present invention, rather than being used to limit the present invention thereto. The present invention should be based on the following claims. All changes or modifications that skilled ones in the art can conveniently consider within the field of the present invention are deemed to be encompassed by the scope of the present invention delineated as the claims set forth hereunder.

What is claimed is:

1. A feedback control method for a charge pump circuit unit, comprising the following steps:
    providing a charge pump circuit unit, in which the charge pump circuit unit includes a controlled current source for controlling an input current inputted to the charge pump circuit unit;
    providing a load circuit which electrically connects to the charge pump circuit unit to have a load current from the charge pump circuit unit passing through the load circuit;
    providing a detecting circuit unit which electrically connects to the load circuit and produces a feedback signal based on the load current; and
    providing a feedback circuit unit which electrically connects to the detecting circuit unit, in which the feedback circuit unit receives the feedback signal and accordingly adjusts the input current of the controlled current source.

2. The method according to claim 1, wherein the charge pump circuit unit includes the controlled current source, a first switch, a capacitor, and a second switch wherein the capacitor is electrically connects to the controlled current source through the first switch, the controlled current source charges the capacitor through the first switch, a second switch connects to the capacitor, and the capacitor discharges through the second switch; whereby the first switch and the second switch are respectively switched based on a first switch signal and a second switch signal, and the conductive periods of the first switch and the second switch are non-overlapped.

3. The method according to claim 2, wherein the charge pump circuit unit further alternatively stops and provides the input current at a dimming frequency based on a dimming signal and the dimming frequency is higher than the frequency range perceivable by human ears.

4. The method according to claim 2, further comprising a third switch which is connected between the controlled current source and ground, and the third switch is switched based on a third switch signal, in which the conductive period of the third switch and the conductive periods of the first switch and the second switch are mutually staggered.

5. The method according to claim 1, wherein the load unit includes an LED module, in which the LED module includes at least one LED and the currents flowing through each LED is substantially equal.

6. The method according to claim 1, further comprising a current limiting circuit unit for controlling the controlled current source, such that the input current is clamped within a predetermined clamp current value, which is adjusted based on the feedback signal.

7. The method according to claim 1, further comprising a dimming switch, connected with the load circuit in series, for controlling whether the load current flows through the load circuit based on a dimming signal.

8. A charge pump circuit which electrically connects to a load circuit, adapted to produce a load current flowing through the load circuit, comprising:
- a charge pump circuit unit which produces the load current, in which the charge pump circuit unit includes a controlled current source for controlling an input current inputted to the charge pump circuit unit;
- a detecting circuit unit which electrically connects to the load circuit and produces a feedback signal based on the load current; and
- a feedback circuit unit which electrically connects to the detecting circuit unit and adjusts the input current of the controlled current source based on the feedback signal.

9. The charge pump circuit according to claim 8, wherein the charge pump circuit unit comprises the controlled current source, a first switch, a capacitor, and a second switch wherein the capacitor is electrically connects to the controlled current source through the first switch, the controlled current source charges the capacitor through the first switch, a second switch connects to the capacitor, and the capacitor discharges through the second switch; whereby the first switch and the second switch are respectively switched based on a first switch signal and a second switch signal, and the conductive periods of the first switch and the second switch are non-overlapped.

10. The charge pump circuit according to claim 9, further comprising a third switch which is connected between the controlled current source and ground, and the third switch is switched by a third switch signal, in which the conductive period of the third switch and the conductive periods of the first switch and the second switch are mutually staggered.

11. The charge pump circuit according to claim 8, further comprising a protecting circuit unit, in which the protecting circuit unit includes an over-current protecting circuit unit, an over-voltage protecting circuit unit, an under-current protecting circuit unit, or the combination thereof.

12. The charge pump circuit according to claim 11, wherein the protecting circuit unit detects the feedback signal, and stops the operation of the charge pump circuit when the feedback signal is higher than an over-current reference voltage or lower than an under-current reference voltage.

13. The charge pump circuit according to claim 11, wherein the under-current protecting circuit unit detects the feedback signal, and stops the operation of the charge pump circuit when the feedback signal remains below an under-current reference voltage for a prescribed duration of time.

14. The charge pump circuit according to claim 11, wherein the over-voltage protecting circuit unit stops the operation of the charge pump circuit when a drive voltage, provided by the charge pump circuit unit for driving the load circuit, is higher than an over-voltage reference voltage.

15. The charge pump circuit according to claim 8, wherein the charge pump circuit unit further alternatively stops and provides the input current at a dimming frequency based on a dimming signal and the dimming frequency is higher than the frequency range perceivable by human ears.

16. The charge pump circuit according to claim 8, wherein the load unit includes an LED module, in which the LED module includes at least one LED and the current flowing through each LED is substantially equal.

17. The charge pump circuit according to claim 8, further comprising a current limiting circuit unit for controlling the controlled current source, such that the input current is clamped within a predetermined clamp current value, which is adjusted based on the feedback signal.

18. The charge pump circuit according to claim 8, further comprising a dimming switch, connected with the load circuit in series, for controlling whether the load current flows through the load circuit based on a dimming signal.

19. A charge pump circuit unit, comprising:
- a controlled current source;
- a dummy path which connects the controlled current source to ground;
- a capacitor which electrically connects to the controlled current source and the dummy path through a first switch, and the controlled current source charges the capacitor through the first switch; and
- a second switch which connects to the capacitor and a load circuit, and the capacitor is discharged through the second switch;
- wherein the first switch and the second switch are respectively switched based on a first switch signal and a second switch signal, the conductive periods of the first switch and the second switch are non-overlapped, and the current of the controlled current source flows toward ground through the dummy path when the first switch signal and the second switch signal are both cutoff.

20. The charge pump circuit unit according to claim 19, further comprising a current limiting circuit unit for clamping the input current within a predetermined clamp current value, which is adjusted based on the feedback signal.

* * * * *